US007542976B2

(12) United States Patent
Wang et al.

(10) Patent No.: US 7,542,976 B2
(45) Date of Patent: Jun. 2, 2009

(54) LOCAL METADATA EMBEDDING AND DECODING

(75) Inventors: Jian Wang, Beijing (CN); Zhouchen Lin, Beijing (CN); Yue Li, Beijing (CN); Chunhui Zhang, Beijing (CN); Yingnong Dang, Beijing (CN); Jiang Wu, San Jose, CA (US); Qiang Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 11/112,637

(22) Filed: Apr. 22, 2005

(65) Prior Publication Data

US 2006/0242560 A1 Oct. 26, 2006

(51) Int. Cl.
*G06F 7/00* (2006.01)
*G06F 17/00* (2006.01)
(52) U.S. Cl. ..................................... 707/10; 707/100
(58) Field of Classification Search .................. 707/10, 707/100
See application file for complete search history.

(56) References Cited

U.S. PATENT DOCUMENTS

| | | | | |
|---|---|---|---|---|
| 4,941,124 | A * | 7/1990 | Skinner, Jr. ..................... | 707/6 |
| 5,181,257 | A * | 1/1993 | Steiner et al. ................ | 382/162 |
| 5,450,603 | A * | 9/1995 | Davies .......................... | 700/4 |
| 5,670,897 | A * | 9/1997 | Kean ............................ | 326/41 |
| 5,765,176 | A * | 6/1998 | Bloomberg .................. | 715/209 |
| 6,000,621 | A * | 12/1999 | Hecht et al. .................. | 235/494 |
| 6,208,771 | B1 * | 3/2001 | Jared et al. .................... | 382/306 |
| 6,834,337 | B1 * | 12/2004 | Mitchell et al. ............. | 710/307 |
| 7,222,799 | B2 * | 5/2007 | Silverbrook ................. | 235/494 |
| 7,225,979 | B2 * | 6/2007 | Silverbrook et al. ........ | 235/383 |
| 2006/0190818 | A1 * | 8/2006 | Wang et al. .................. | 715/530 |
| 2006/0242560 | A1 * | 10/2006 | Wang et al. .................. | 715/513 |
| 2006/0242622 | A1 * | 10/2006 | Wang et al. .................. | 717/106 |

OTHER PUBLICATIONS

"Numerical Evaluation of Correlation Parameters for Optimal Phrases of Binar Register Sequences"—Pursley. M and Roefs, H.—Communications, IEEE Transactions on Oct. 1979 vol. 27, Issue 10, Part 1, (pp. 1597-1604 (1-8)).*
"Maximal and Near-Maximal Shift register Sequences: Efficient Event Counters and Easy Discrete Logarithms"—Douglas W. Clark and Lih-Jyh Weng—IEEE Transactions on Computers, vol. 43, Issue 5, May 1994, (pp. 560-582 or 1-23).*

* cited by examiner

*Primary Examiner*—John E Breene
*Assistant Examiner*—Anh Ly
(74) *Attorney, Agent, or Firm*—Perkins Coie LLP

(57) ABSTRACT

In accordance with embodiments of the invention, local metadata is embedded into an embedded interactive code document by combining a first m-array and a second m-array to generate a combined m-array with encoded local metadata such that a start position of the second m-array in the combined m-array is shifted, by an amount that is based on the local metadata, relative to a start position of the first m-array in the combined m-array. The first m-array and the second m-array may contain the same repeating bit sequence. Local metadata may be decoded from the embedded interactive code document by decoding the local metadata from the combined m-array by determining the amount by which the second m-array is shifted, relative to the first m-array, in the combined m-array.

20 Claims, 16 Drawing Sheets

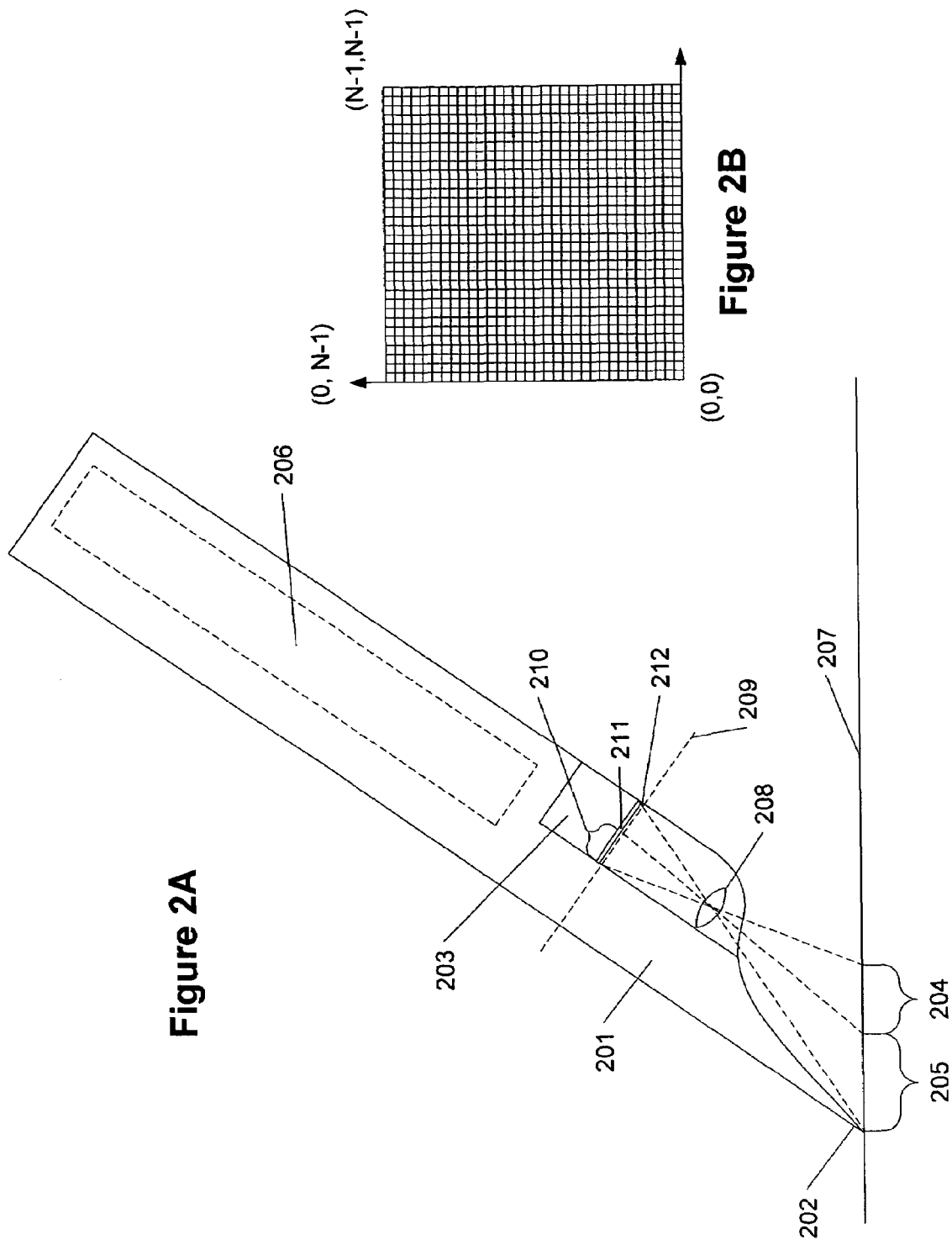

Figure 3A  0000010 00 01100 0101 001 111010 0 011001 0 010110 111 0110 01101 01 0111111
Figure 3B  0000000 0011101 0100111 1110100 0111010 1000101 1110100 0100111 0011101
Figure 3C  000100100 001111110 010111101 010011001 011100111 001011010 011000011
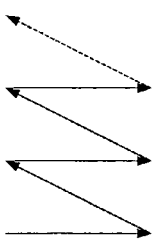
Figure 3C
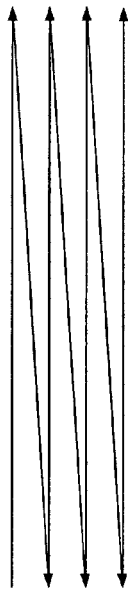
Figure 3D
Figure 3E
Figure 3F

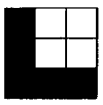  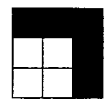 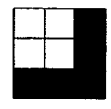
Figure 5A  Figure 5B  Figure 5C  Figure 5D
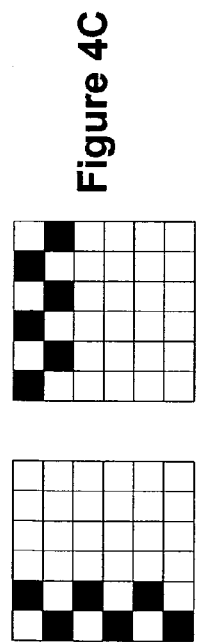
Figure 4C
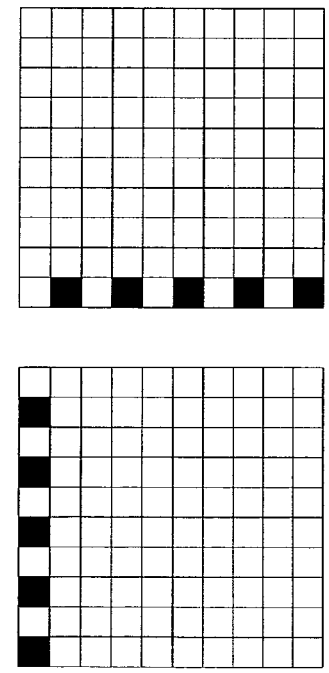
Figure 4D
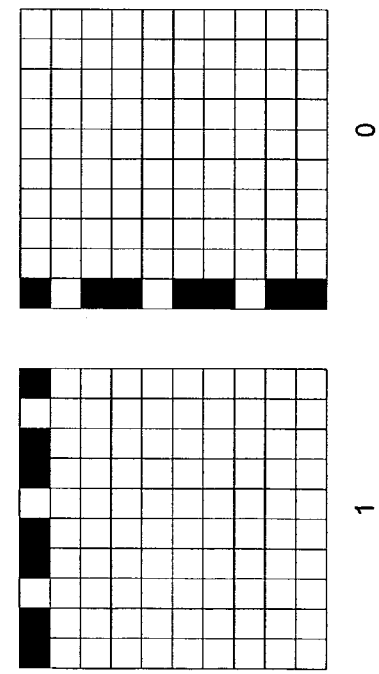
Figure 4E $$o = \theta + \begin{cases} 0 - no\ a \\ \dfrac{\pi}{2} - no\ b \\ \pi - no\ c \\ \dfrac{3\pi}{2} - no\ d \end{cases}$$

Performance Review

Review Period: 1701   1703   Review Date: 1705

Name: 1707   Manager Name: 1709

Title: 1711   Department: 1713

ID Number: 1715

E-mail Address: 1717

1700

Skills Table

| Competency | Employee Rating 1719 | | | | | | Manager Rating 1721 | | | | | |
|---|---|---|---|---|---|---|---|---|---|---|---|---|
| | 1 | 2 | 3 | 4 | 5 | n/a | 1 | 2 | 3 | 4 | 5 | n/a |
| Problem solving | ○ | ○ | ○ | ○ | ○ | ● | ○ | ○ | ○ | ○ | ○ | ● |
| Decision making | ○ | ○ | ○ | ○ | ○ | ● | ○ | ○ | ○ | ○ | ○ | ● |
| Long-term thinking | ○ | ○ | ○ | ○ | ○ | ● | ○ | ○ | ○ | ○ | ○ | ● |
| Results oriented | ○ | ○ | ○ | ○ | ○ | ● | ○ | ○ | ○ | ○ | ○ | ● |
| Organization and prioritization | ○ | ○ | ○ | ○ | ○ | ● | ○ | ○ | ○ | ○ | ○ | ● |
| Flexibility and change management | ○ | ○ | ○ | ○ | ○ | ● | ○ | ○ | ○ | ○ | ○ | ● |
| Customer service | ○ | ○ | ○ | ○ | ○ | ● | ○ | ○ | ○ | ○ | ○ | ● |
| Company representation | ○ | ○ | ○ | ○ | ○ | ● | ○ | ○ | ○ | ○ | ○ | ● |
| Communication | ○ | ○ | ○ | ○ | ○ | ● | ○ | ○ | ○ | ○ | ○ | ● |
| Conflict management | ○ | ○ | ○ | ○ | ○ | ● | ○ | ○ | ○ | ○ | ○ | ● |
| Self-confidence | ○ | ○ | ○ | ○ | ○ | ● | ○ | ○ | ○ | ○ | ○ | ● |
| Integrity and reliability | ○ | ○ | ○ | ○ | ○ | ● | ○ | ○ | ○ | ○ | ○ | ● |

1723

Signatures

Sign and print your name.

Employee _____ Date _____

Manager _____ Date _____

Senior Manager _____ Date _____

Group Manager _____ Date _____

Figure 17

LOCAL METADATA EMBEDDING AND DECODING

TECHNICAL FIELD

Embodiments of the invention relate to embedding local metadata in an embedded interaction code document and decoding local metadata from such a document.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations made on it by the user. One of the difficulties, however, with having a printed document with annotations is the need to have the annotations subsequently entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations would be desirable.

One technique for capturing handwritten information is by using an image capturing pen whose location may be determined during writing. One image capturing pen that provides this capability is the Anoto pen by Anoto Inc. This pen functions by using a camera to capture an image of paper encoded with a predefined pattern. An example of the image pattern is shown in FIG. 11. This pattern is used by the Anoto pen to determine a location of the pen on a piece of paper (or other positionally encoded medium).

A user may wish to access and annotate any one of a number of digital documents, which may be further specified by a document version. Moreover, an associated paper document is typically partitioned into a number of pages, which may be hundreds of pages. An application should know the particular page of a stroke (ink) to associate the stroke to the paper document. Once the page is identified, the location of the stroke on the page may be determined.

Documents may contain particular regions, such as fields of a form, that a user may interact with via a digital pen. It would be desirable to associate various local metadata values with respective regions of an embedded interaction code document to facilitate determining which region of a document a user is interacting with.

SUMMARY

In accordance with embodiments of the invention, local metadata may be embedded to various regions within an embedded interaction code document. Such embedded local metadata provides increased flexibility to application programs with respect to allowing users to perform region-related tasks, such as filling in forms.

In accordance with embodiments of the invention, local metadata is embedded into an embedded interactive code document by combining a first m-array and a second m-array to generate a combined m-array with encoded local metadata such that a start position of the second m-array in the combined m-array is shifted, by an amount that is based on the local metadata, relative to a start position of the first m-array in the combined m-array. The first m-array and the second m-array may contain the same repeating bit sequence. Local metadata may be decoded from the embedded interactive code document by decoding the local metadata from the combined m-array by determining the amount by which the second m-array is shifted, relative to the first m-array, in the combined m-array.

These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

FIG. 17 shows an example of an InfoPath form according to an embodiment of the invention.

DETAILED DESCRIPTION

Aspects of the present invention relate to embedding local metadata in an embedded-interaction-code (EIC) document and decoding local metadata from an EIC document.

The following description is separated by subheadings for the benefit of the reader. The subheadings include: Terms, General-Purpose Computer, Image Capturing Pen, Encoding of Array, Decoding, Error Correction, Location Determination, Local Metadata Encoding, Local Metadata Decoding, and Example Uses of Local Metadata in EIC Documents.

Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

General Purpose Computer

Figure 1:
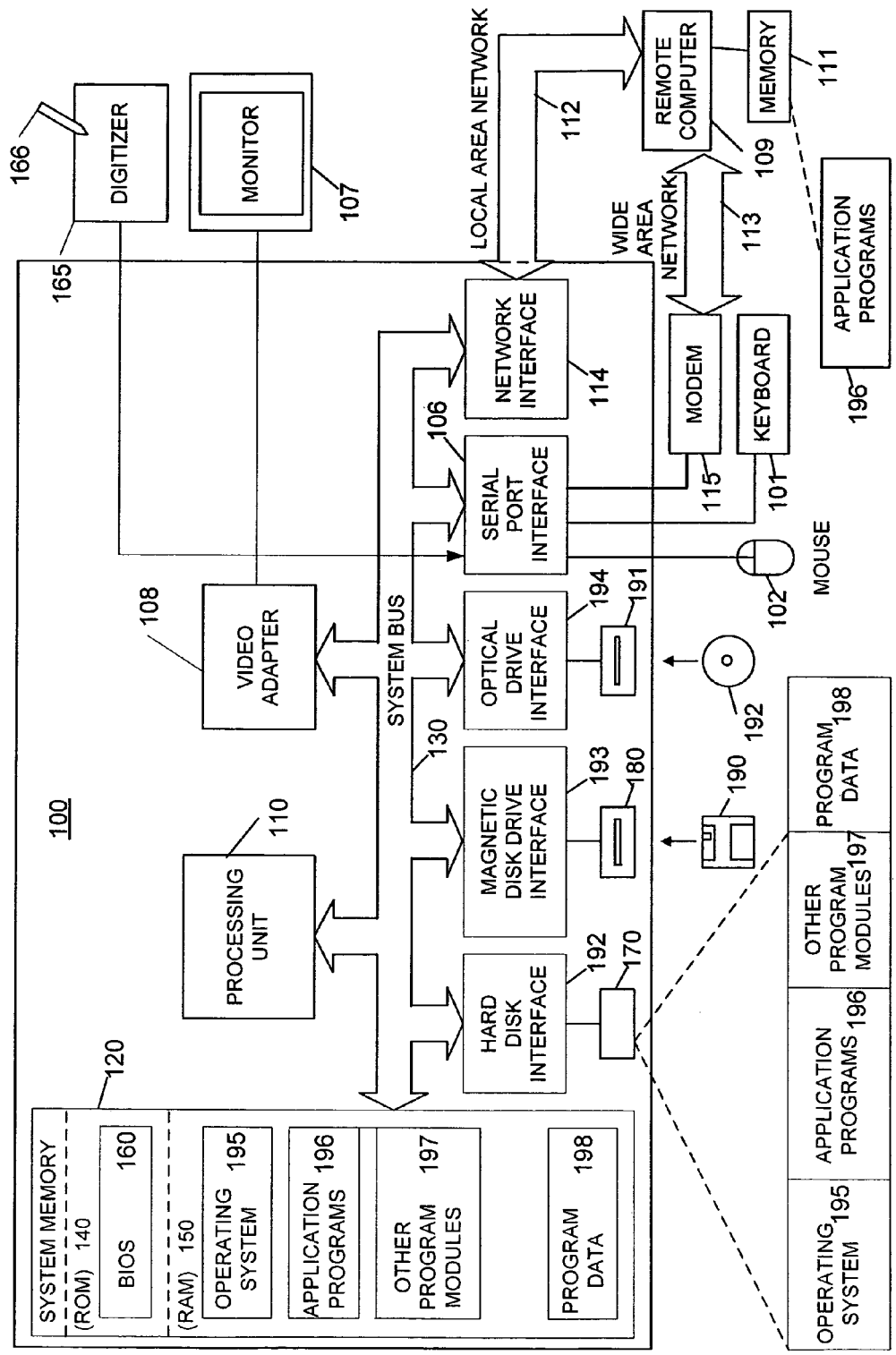
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \rightarrow P}$ transforms position coordinates in the image captured by camera to position coordinates in the real image on the paper:

$$L_{paper} = F_{S \rightarrow P}(L_{sensor}),$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip}),$$

The transformation $F_{S \rightarrow P}$ may be estimated as an affine transform, which approximates $F_{S \rightarrow P}$ as:

$$F'_{S \rightarrow P} = \begin{bmatrix} \frac{\sin\theta_y}{s_x} & \frac{\cos\theta_y}{s_x} & 0 \\ \frac{-\sin\theta_x}{s_y} & \frac{\cos\theta_x}{s_y} & 0 \\ 0 & 0 & 1 \end{bmatrix},$$

in which $\theta_x$, $\theta_y$, $s_x$, and $s_y$ are the rotation and scale of two orientations of the pattern captured at location 204. Further, one can refine $F'_{S \rightarrow P}$ by matching the captured image with the corresponding real image on paper. "Refine" means to get a more precise estimation of the transformation $F_{S \rightarrow P}$ by a type of optimization algorithm referred to as a recursive method. The recursive method treats the matrix $F'_{S \rightarrow P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \rightarrow P}$. From this transformation, one can obtain the location of the virtual pen tip $L_{virtual-pentip}$:

$$L_{virtual-pentip} = F_{P \rightarrow S}(L_{pentip}),$$

where $L_{pentip}$ is initialized as (0, 0) and $$F_{P \rightarrow S} = (F_{S \rightarrow P})^{-1}.$$

By averaging the $L_{virtual-pentip}$ obtained from each image, a location of the virtual pen tip $L_{virtual-pentip}$ may be determined. With $L_{virtual-pentip}$ one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \rightarrow P}$ from the images captured. Finally, one can use this information to determine the location of the real pen tip $L_{pentip}$:

$$L_{pentip} = F_{S \rightarrow P}(L_{virtual-pentip}).$$

Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence.

The process described above is but one of a variety of processes that may be used to create a sequence with the window property.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1,l)=A(k,l+m_2)=A(k,l)$. When an $n_1 \times n_2$ window shifts through a period of A, all the nonzero $n_1 \times n_2$ matrices over $F_q$ appear once and only once. This property is also referred to as a "window property" in that each window is unique. A widow may then be expressed as an array of period $(m_1, m_2)$ (with $m_1$ and $m_2$ being the horizontal and vertical number of bits present in the array) and order $(n_1, n_2)$.

A binary array (or m-array) may be constructed by folding the sequence. One approach is to obtain a sequence then fold it to a size of $m_1 \times m_2$ where the length of the array is $L=m_1 \times m_2=2^n-1$. Alternatively, one may start with a predetermined size of the space that one wants to cover (for example, one sheet of paper, 30 sheets of paper or the size of a computer monitor), determine the area $(m_1 \times m_2)$, then use the size to let $L \geq m_1 \times m_2$, where $L=2^n-1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$, is created from the sequence $\{a_i\}$ by letting each bit of the array be calculated as shown by equation 1:

$$b_{kl}=a_i, \text{ where } k=i \bmod(m_1), l=i \bmod(m_2), i=0, \ldots, L-1. \quad (1)$$

This folding approach may be alternatively expressed as laying the sequence on the diagonal of the array, then continuing from the opposite edge when an edge is reached.

Figures 4A, 4B:
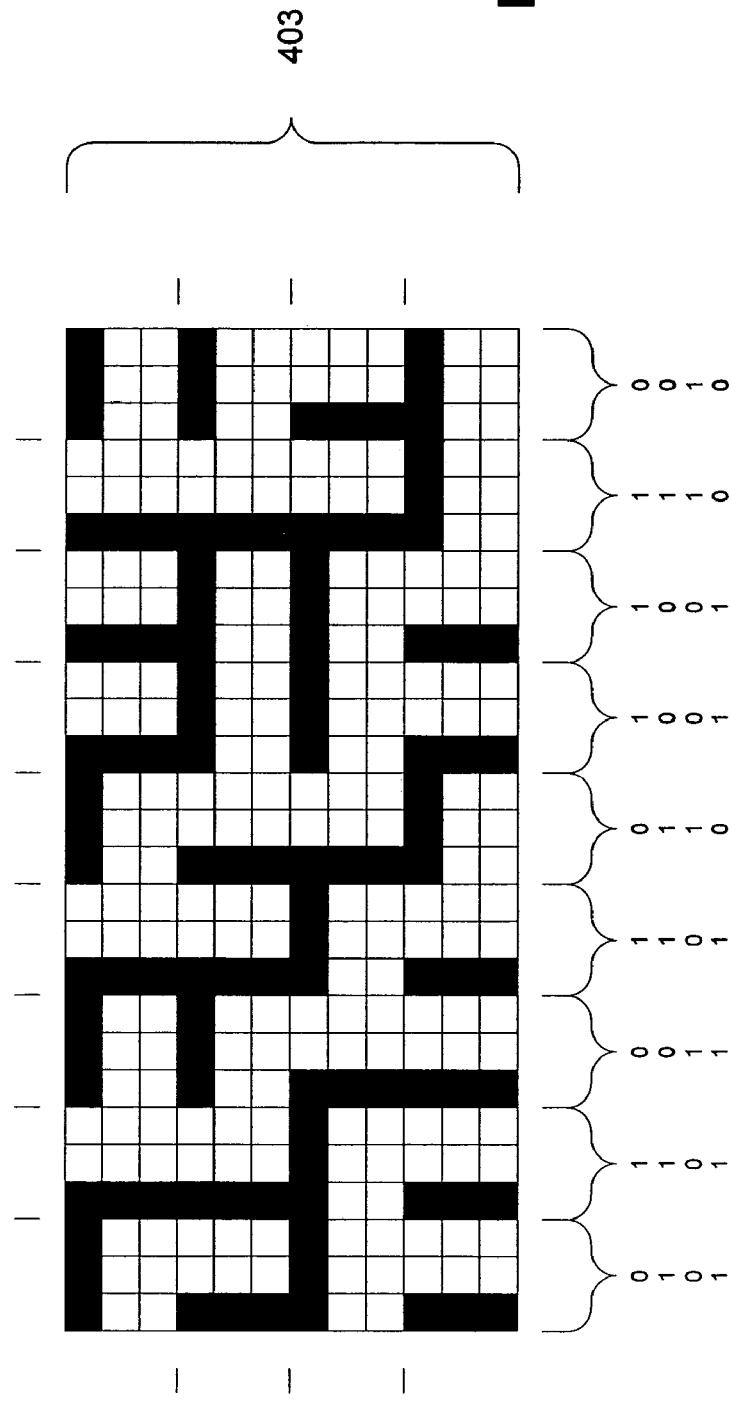
Figure 11:
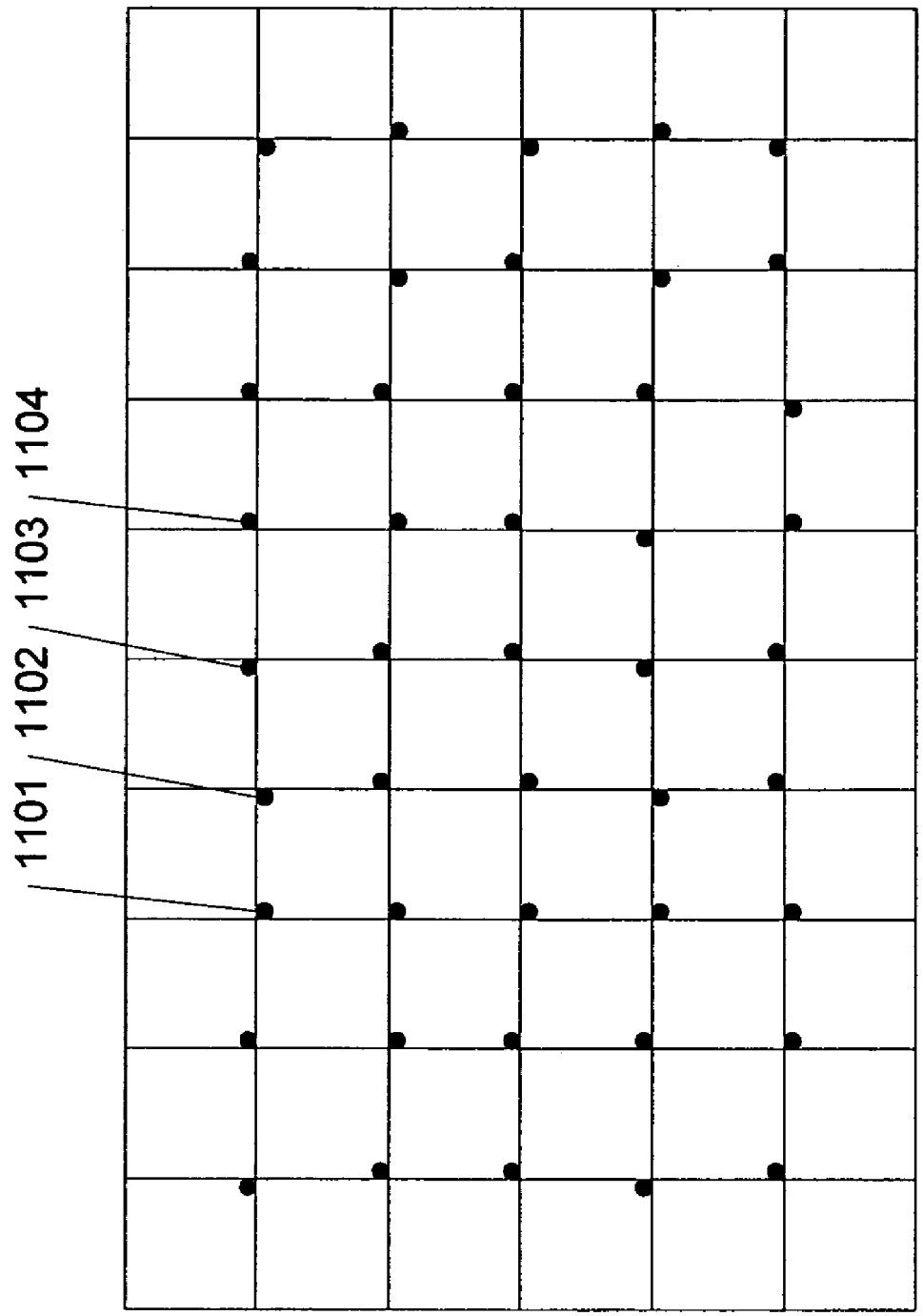
FIG. 11 shows a representation of encoding space in a document according to prior art.

FIG. 4A shows sample encoding techniques that may be used to encode the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}.$$

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

For the determination of the orientation of the captured image relative to the whole encoded area, one may notice that not all the four conceivable corners shown in FIG. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Figures 6, 7:
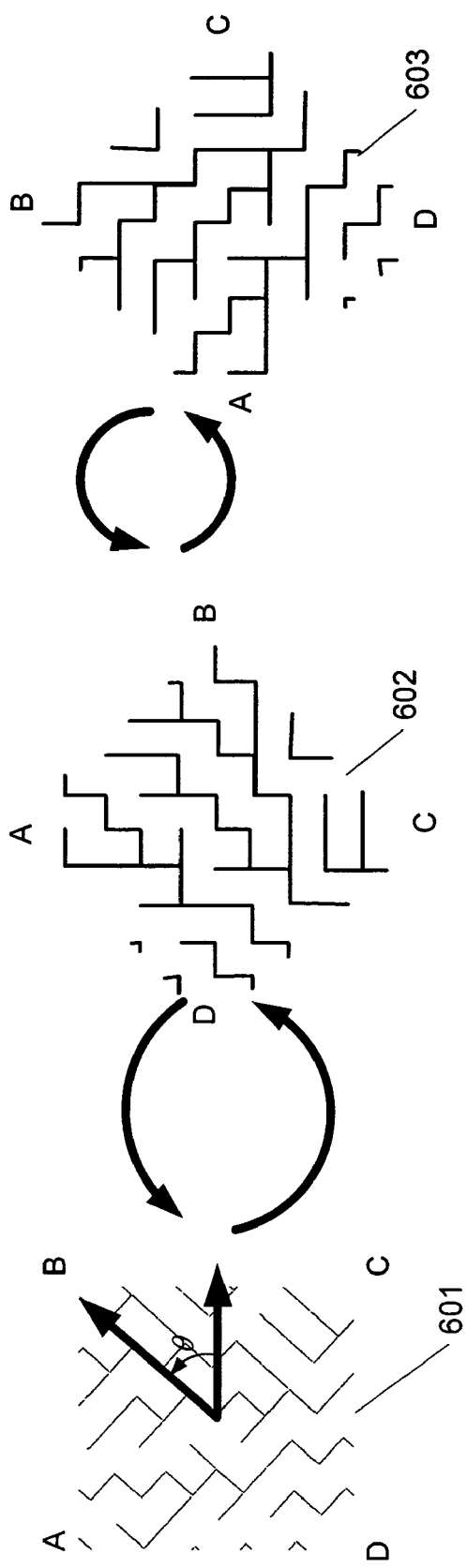
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

As will be discussed, maze pattern analysis obtains recovered bits from image 603. Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2 \ldots b_{K-1})^t$, where K≧n and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0 + r_1 x + \ldots r_{n-1} x^{n-1} \bmod(P_n(x))$. Therefore, we may find $(r_0, r_1, \ldots, r_{n-1})$ and then solve for s.

The relationship $x^s \equiv r_0 + r_1 x + \ldots r_{n-1} x^{n-1} \bmod(P_n(x))$ implies that $R = r_0 + r_1 T(I) + \ldots + r_{n-1} T^{n-1}(I)$. Written in a binary linear equation, it becomes:

$$R = r^t A, \qquad (2)$$

where $r=(r_0\ r_1\ r_2 \ldots r_{n-1})^t$, and $A=(I\ T(I) \ldots T^{n-1}(I))^t$ which consists of the cyclic shifts of I from 0-shift to (n−1)-shift. Now only sparse K bits are available in R to solve r. Let the index differences between $b_i$ and $b_0$ in R be $k_i$, i=1,2,..., k−1, then the $1^{st}$ and $(k_i+1)$-th elements of R, i=1,2,..., k−1, are exactly $b_0, b_i, \ldots, b_{k-1}$. By selecting the $1^{st}$ and $(k_i+1)$-th columns of A, i=1,2,..., k−1, the following binary linear equation is formed:

$$b^t = r^t M, \qquad (3)$$

where M is an n×K sub-matrix of A.

If b is error-free, the solution of r may be expressed as:

$$r^t = \tilde{b}^t \tilde{M}^{-1} \qquad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568) to find s so that $x^s \equiv r_0 + r_1 x + \ldots r_{n-1} x^{n-1} \bmod(P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L=2^n-1$ is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\widetilde{M}$ of M being non-degenerate is high.

When the n bits chosen are all correct, the Hamming distance between b' and $r_tM$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
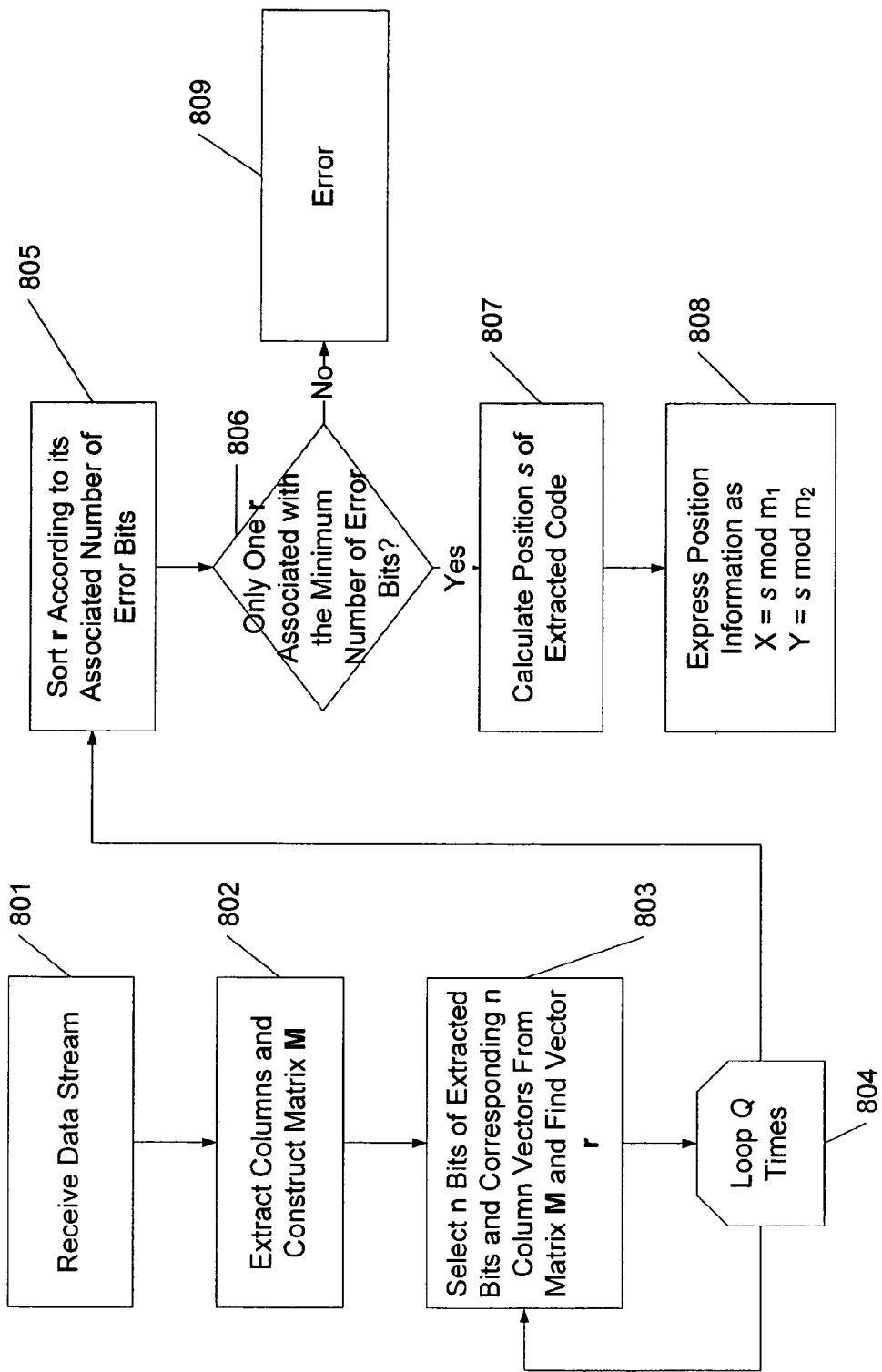
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating that decoding process failed. If not, the position s of the extracted bits in the sequence (or m-sequence) is calculated in step 807, for example, by using the Pohig-Hellman-Silver algorithm.

Next, the (X,Y) position in the array is calculated as: $x=s \bmod m_1$ and $y=s \bmod m_2$ and the results are returned in step 808.

Location Determination

Figure 9:
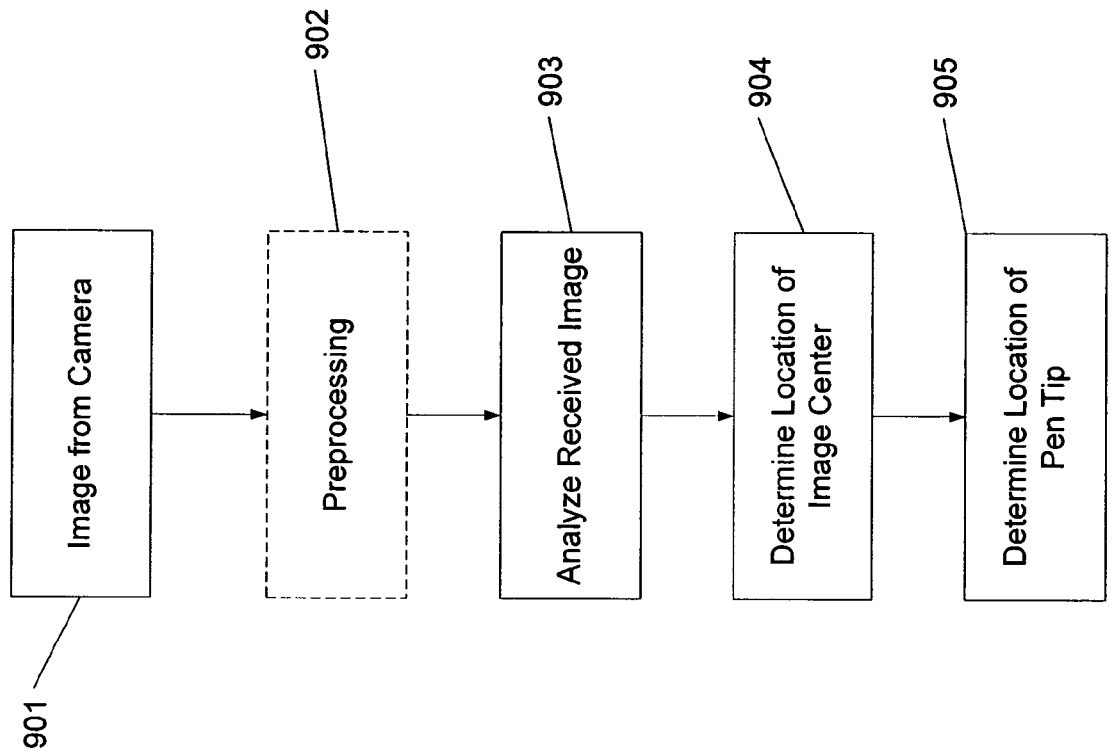
FIG. 9 shows a method for determining the location of a captured image in accordance with embodiments of the present invention.

FIG. 9 shows a process for determining the location of a pen tip. The input is an image captured by a camera and the output may be position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
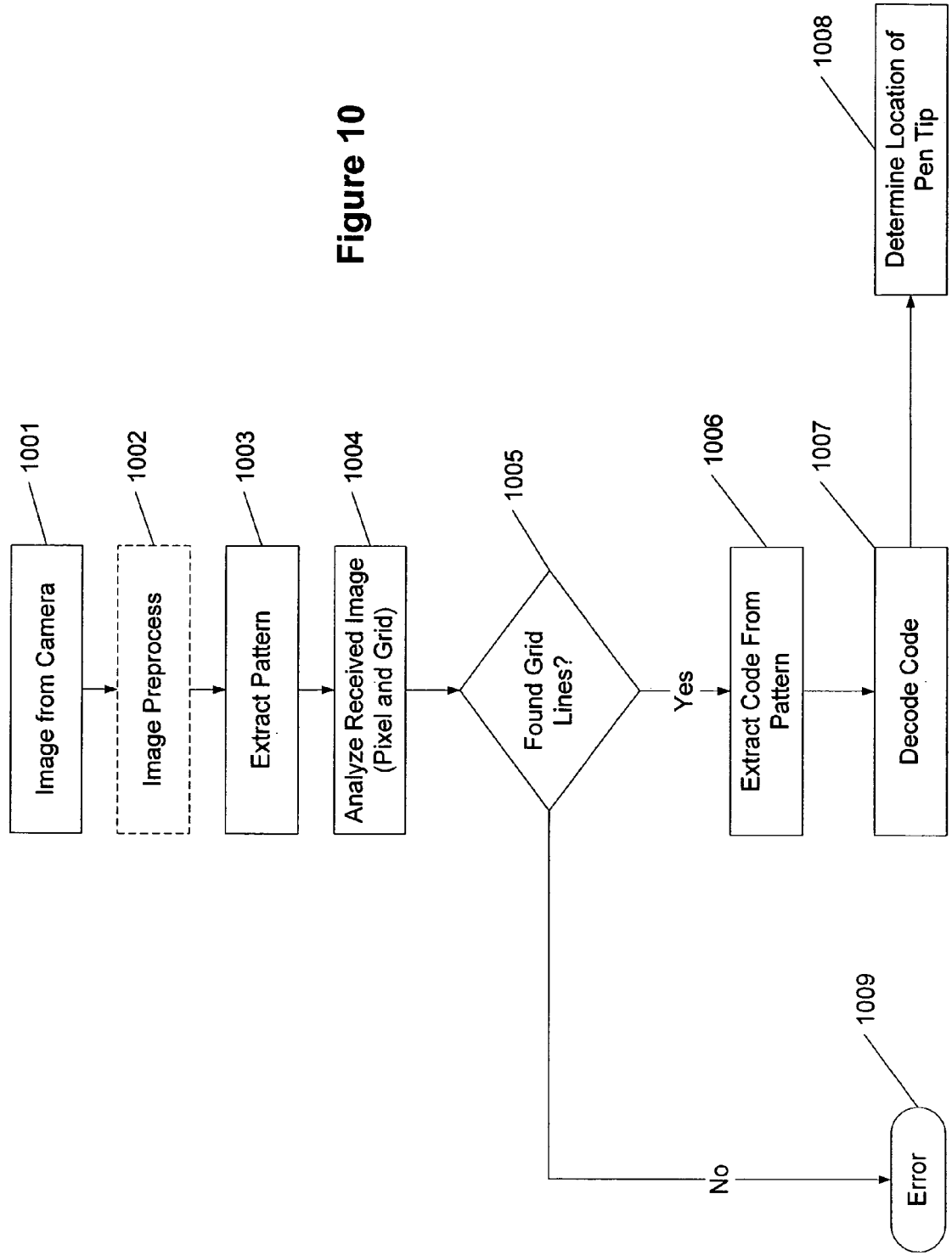
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle θ.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

Local Metadata Encoding

Figure 12:
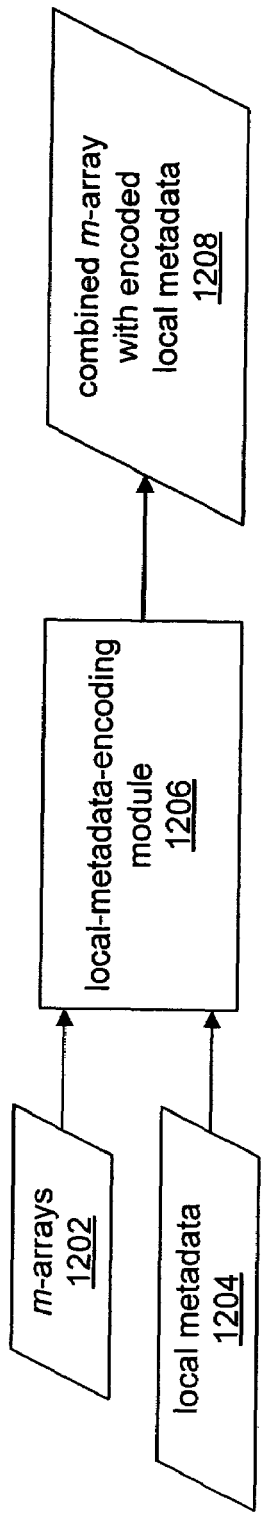
FIG. 12 shows a flow diagram of a system for encoding local metadata in accordance with embodiments of the invention.

FIG. 12 shows a flow diagram of a system for encoding local metadata in accordance with embodiments of the invention. One or more m-arrays, as depicted by m-arrays 1202, and local metadata 1204 are input to a local-metadata-encoding module 1206, which outputs a combined array with encoded local metadata 1208. The one or more input m-arrays may be m-arrays such as position m-array 1402 and local metadata m-array 1404, which are both depicted in FIG. 14.

In accordance with embodiments of the invention, regardless of whether a region is embedded with local metadata, the regions may be encoded using a combined m-array, where the local-metadata m-array may be the same as the m-array that represents X, Y position information, and the metadata m-array may be shifted according to the value of the metadata. If a region is not embedded with local metadata, 0 may be chosen as the value of its local metadata, i.e., the metadata m-array is not shifted. Therefore, 0 is not used as the value of local metadata in regions that are selected to embed local metadata.

Figure 14:
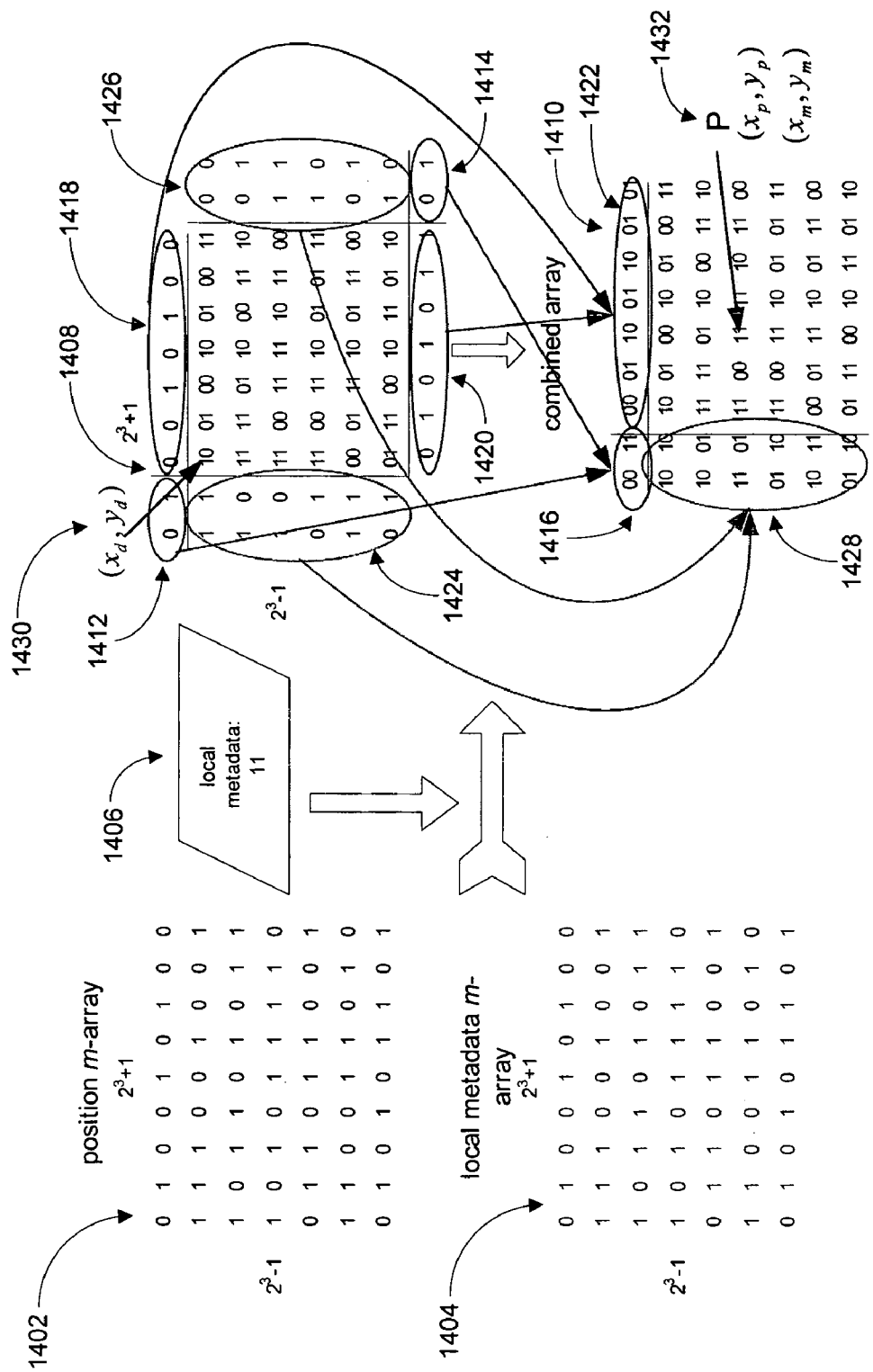
FIG. 14 shows a local-metadata-encoding example in accordance with embodiments of the invention.

FIG. 14 shows a local-metadata-encoding example in accordance with embodiments of the invention. Two identical m-arrays, a position m-array 1402 and a local metadata m-array 1404, are shown on the left side of FIG. 14. Both m-arrays are order 6 m-arrays. Therefore, the width of each m-array is $2^3+1$, and the height of each m-array is $2^3-1$. The position m-array and the local metadata m-array may contain repeating bit sequences that are the same length but that have different bit sequences than each other. Stated differently, different primitive polynomials of order n may be used to generate different m-arrays containing different repeating bit sequences.

Figure 15:
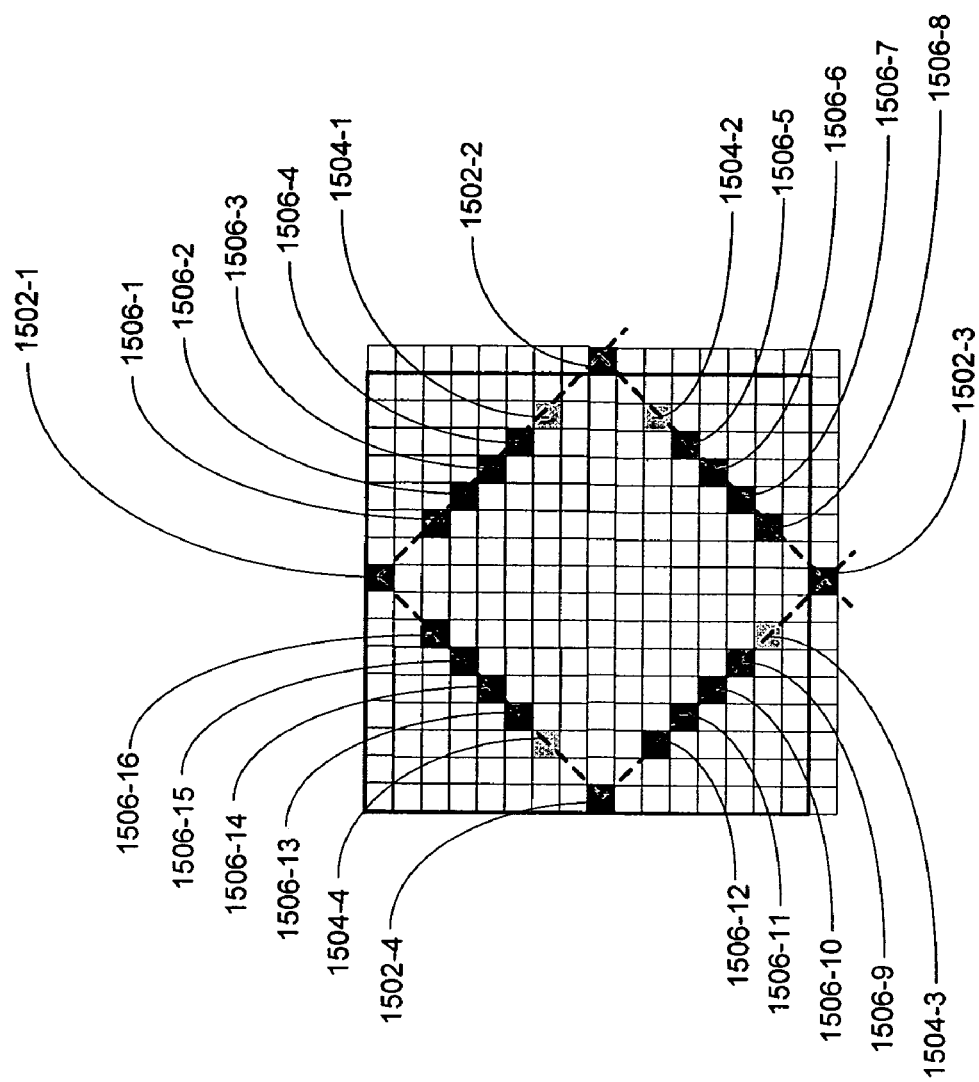
FIG. 15 shows an example of an EIC symbol in accordance with embodiments of the invention.

The two m-arrays may be combined, in accordance with embodiments of the invention, to encode two bits in one EIC symbol. An example of an EIC symbol is depicted in FIG. 15. The EIC symbol in FIG. 15 occupies all of the rows and columns of grid spaces shown in FIG. 15 except for the bottom row and the right-most column. That row and that column belong to adjacent EIC symbols. Accordingly, while black dots 1502-1 and 1502-4 belong to the EIC symbol shown in FIG. 15, black dots 1502-2 and 1502-3 are not part of that EIC symbol. Data dots 1506-1 through 1506-16 may be black or white for representing bits of information. Orientation dots 1504-1 through 1504-4 are always white to facilitate properly orienting camera-captured EIC-symbol images.

When the position m-array 1402 and the local metadata m-array 1404 are combined, based on the value of the local metadata (e.g., 11), the start of the local metadata m-array 1404 is shifted to position $(x_d, y_d)$, as depicted at 1430 in FIG. 14, of the position m-array 1402. The x,y coordinates may be calculated as follows:

$$x_d = \mod(\text{local } metadata, 2^{\frac{n}{2}} + 1),$$

$$y_d = int\left(\frac{\text{local } metadata}{2^{\frac{n}{2}} + 1}\right),$$

where n is the order of the m-array and $0 \leq \text{local } metadata \leq 2^n - 2$.

In FIG. 14, the value of the local metadata 1406 being encoded is 11 and the order of the m-arrays is 6 (i.e., n=6). Therefore, $$x_d = \mod\left(11, 2^{\frac{6}{2}} + 1\right) = 2,$$

$$y_d = int\left(\frac{11}{2^{\frac{6}{2}} + 1}\right) = 1.$$

As shown in the partially combined m-array 1408, the local metadata m-array 1404 starts at position (2,1) of the position m-array 1402. Since the position m-array 1402 and the local metadata m-array 1404 repeat themselves, a combined m-array with encoded local metadata 1410, which is shown in the lower right corner of FIG. 14, may be generated. As a result of starting the local metadata m-array 1404 at (2,1), portions 1420, 1414, and 1426 of the local metadata m-array 1404 are left over after combining the overlapping rows and columns of the position m-array 1402 and the local metadata m-array 1404. Portion 1426 of the local metadata m-array 1404 and portion 1424 of the position m-array 1402 are combined in the combined array 1410, as depicted at 1428. Similarly, portion 1414 of the local metadata m-array 1404 and portion 1412 of the position m-array 1402 are combined in the combined array 1410 as depicted at 1416. And portion 1420 of the local metadata m-array 1404 and portion 1418 of the position m-array 1402 are combined in the combined array 1410 as depicted at 1422.

The value of the metadata is the distance in the combined array between the position m-array 1402 and the local metadata m-array 1404. The distance is kept the same in every pair of bits in the combined array 1410. Therefore, if the position of each bit in its corresponding m-array is obtained, the distance in the combined array 1410 can be determined.

Local Metadata Decoding

Figure 13:
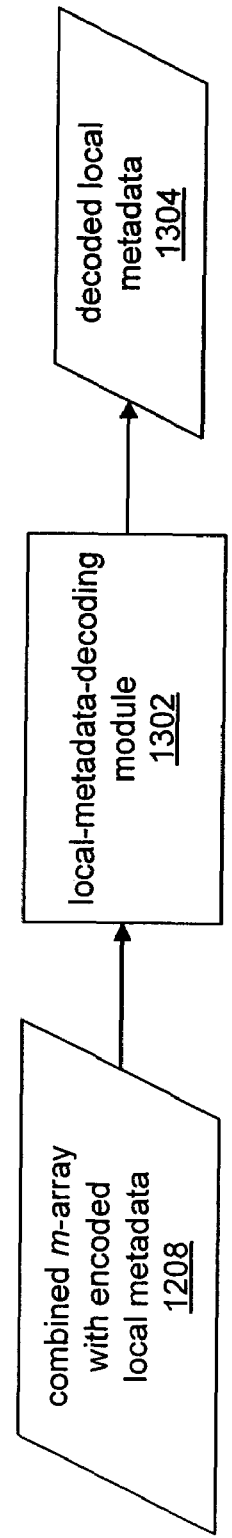
FIG. 13 shows a flow diagram of a system for decoding local metadata in accordance with embodiments of the invention.

FIG. 13 shows a flow diagram of a system for decoding local metadata in accordance with embodiments of the invention. A combined array with encoded local metadata 1208 is input to a local-metadata-decoding module 1302, which outputs decoded local metadata 1304.

To decode local metadata, the m-arrays that have been combined to form the combined array 1208 are each separately decoded. For example, referring to the example shown in FIG. 14, the position m-array 1402 and the local metadata m-array 1404 are separately decoded. Then, for a particular point P 1432, two positions are obtained: $(x_p, y_p)$, the position of the point in the position m-array 1402, and $(x_m, y_m)$, the position of the point in the local metadata m-array 1404.

The value of the local metadata may then be calculated as follows:

$$\text{local } metadata = \mod(y_p - y_m, 2^{\frac{n}{2}} - 1) \cdot (2^{\frac{n}{2}} + 1) + \mod(x_p - x_m, 2^{\frac{n}{2}} + 1),$$

where n is the order of the combined m-array 1208.

In the example shown in FIG. 14, the position of P in the first m-array is (4,3). The position of P in the second m-array is (2,2). Therefore, the value of metadata is:

local metadata=mod(3−2,2³−1)·(2³+1)+mod(4−2,2³+1)=11.

Example Uses of Local Metadata in EIC Documents

To achieve synchronization between a paper document and a digital document, it is desirable to establish a mapping between the paper document and the digital document. An EIC pattern may support embedded metadata as well as (x, y) position information. The metadata may include local metadata for identifying particular regions within a document. For instance, local metadata may be used to identify various fields, which accept user input, of a form.

Figure 16:
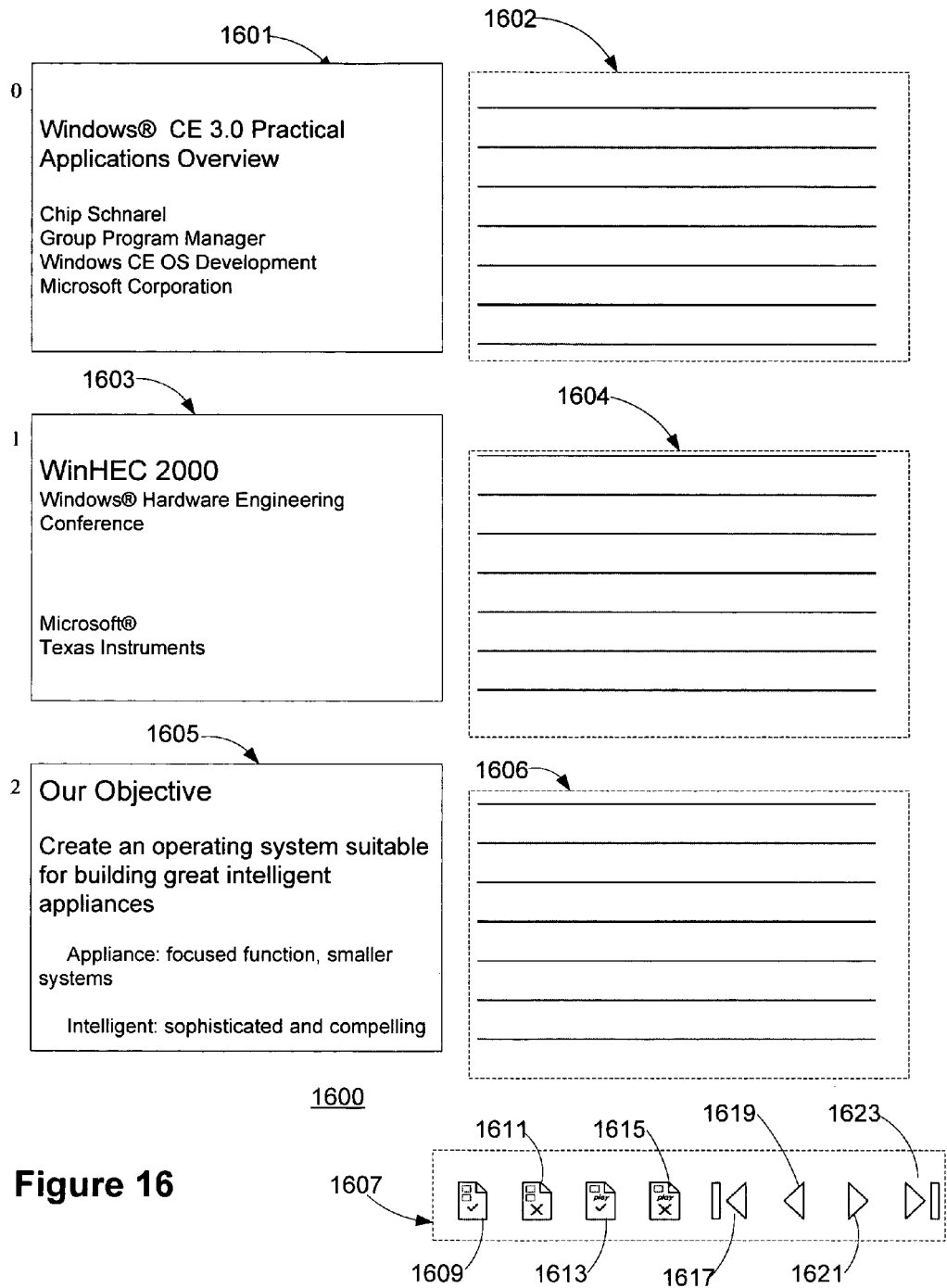
FIG. 16 shows an example of EIC command control according to an embodiment of the invention.

FIG. 16 shows an example of EIC command control regions on a printed page 1600 according to embodiments of the invention. In order to improve the interactive capacity of an image-capturing-pen system, embodiments of the invention support an EIC command control capability (corresponding to interactive command control region 1607). A command control region (e.g., interactive command control region 1607) is typically a rectangular area on a paper document. When a user puts a pen tip in contact with a command control region on the paper document, a command request with a command ID and command-specific information may be sent to the application. The application may subsequently perform a corresponding application command that is associated with a command control (e.g., command 1617 to go to the first slide in a PowerPoint presentation). The command request may contain any of the following information:

Command ID: an ID identifying the command.

Command Parameters: bound together with the command, the command parameters may be sent to the corresponding application to be processed when the command is activated.

Command Control Region: the area of the EIC Command Control.

Command Transformation: the transformation is applied on the resulting stroke when the command is activated, and the transform result is sent to the corresponding application to process.

FIG. 16 illustrates an example of 14 EIC command controls as follows.

3 command controls for slides: if the image-capturing pen writes on these controls (controls 1601, 1603, and 1605), strokes will be synchronized into the corresponding slide in PowerPoint® through an Addin. The PowerPoint Addin is responsible for receiving and processing command requests from the image-capturing pen.

3 command controls for notes: if the image-capturing pen writes on these controls (controls 1602, 1604, and 1606), strokes will be recognized and the result will be synchronized into PowerPoint.

8 command controls for interactive commands: the command controls represent 8 typical commands in PowerPoint, open a ppt document (command 1609), close a ppt document (command 1611), show slides (command 1613), quit showing (command 1615), go to the first slide (command 1617), go to the previous slide (command 1619), go to the next slide (command 1621), and go to the last slide (command 1623).

FIG. 17 shows an example InfoPath™ form 1700 (corresponding to a printed document) according to embodiments of the invention. An EIC document object refers to objects defined by applications and delegated to the EIC document. In the embodiments, the EIC document object contains the following information:

EIC object ID: a unique ID identifying the object.
   Data: the data information of the object. It may be of any type, e.g., text and/or graphic
   Binding Context: specifies to which part the object is associated. The binding context includes:
      Global: which means that the object is bound with the entire EIC Document; or
      Page: which means that the object is bound to a specified page; or
      Region: the object is bound to a specified region in the EIC Document.

The EIC document provides a mechanism for associating a part of a paper document with an application-defined object in a corresponding digital document. Consequently, an image-capturing-pen operation may be associated with one or more application-defined objects in the corresponding digital document. As a result, even though the digital document looks different from the paper document or may change, an image-capture-pen operation is interpreted and synchronized to the digital document if corresponding EIC document objects exist.

A typical application of EIC document object is InfoPath®. InfoPath should be informed of which form field (e.g., fields 1701-1723) the new ink (stroke) belongs to. InfoPath® should also recognize the ink according to the type of the field and then fill the recognized results into the field automatically. For example, a converted character string may be inserted in field 1701 while the strokes that correspond to a signature remain in field 1723 to preserve the original signature.

Figure 18:
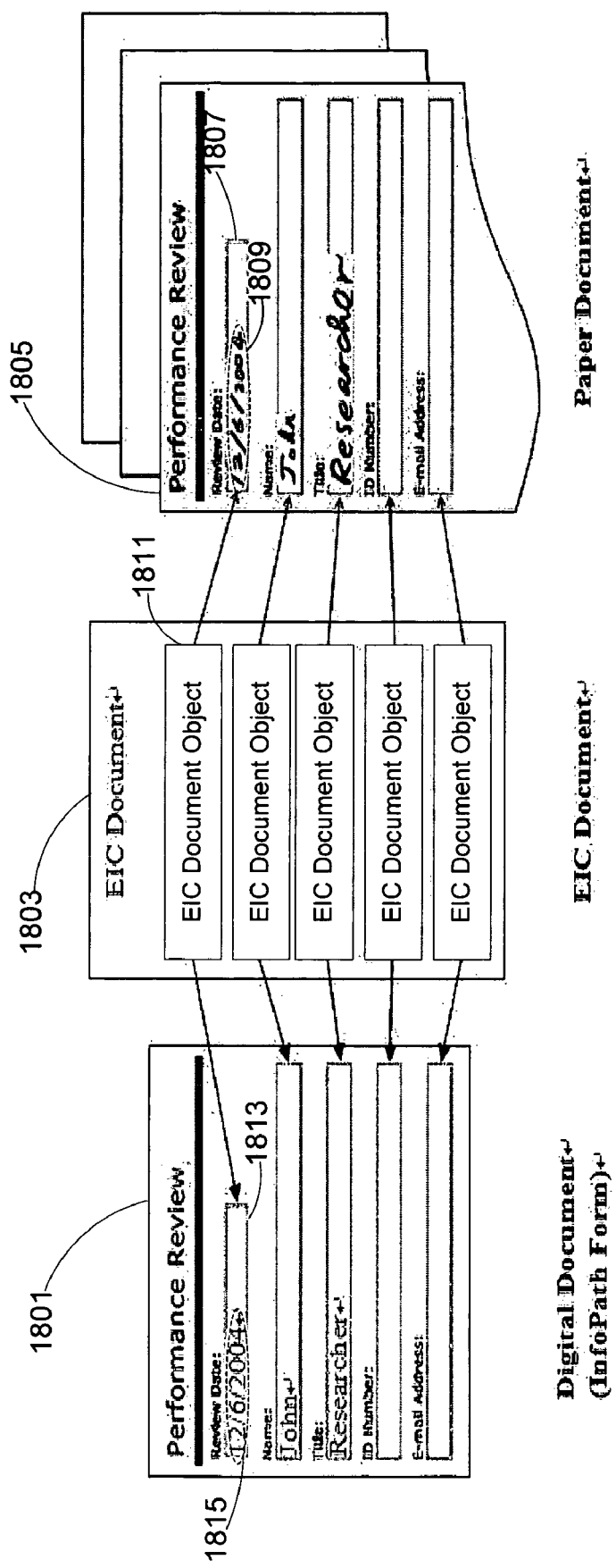
FIG. 18 illustrates a relationship between EIC document objects and strokes according to an embodiment of the invention.

FIG. 18 illustrates a relationship between EIC document objects and associated strokes according to embodiments of the invention. Every field of interest (e.g., field 1807 of paper document 1805) has a corresponding EIC document object (e.g., EIC document object 1811 in EIC document 1803), which describes the position, type and other application-specific information.

In the embodiments, every EIC document object contains corresponding information, including the position (x,y) of the field on paper and the XPath of the field in InfoPath form 1801. (The primary purpose of XPath is to address parts of an Extensible Markup Language (XML) document.) When a stroke (ink) is written, InfoPath receives the stroke information. The stroke (e.g., stroke 1809) corresponds to a stroke object. The strokes object stores stroke data. The stroke object may include a Pen ID, which is a unique ID identifying the pen that writes the stroke, and binding information for binding the stroke object to one or more EIC document objects.

InfoPath then iterates over substantially all EIC document objects in the EIC document and finds the EIC document object that is nearest to the stroke (according to position information of fields on paper). In this way, InfoPath can figure out which EIC document object each stroke belongs to. The embodiment may associate different strokes with each other if the different strokes are associated with the same document entity, e.g., a user's signature. Each stroke may be associated with multiple stroke objects, which are mapped to the same or different EIC document objects. A stroke object is typically mapped to an EIC document object, although a stroke object may be mapped to a plurality of EIC document objects.

When a user requests InfoPath to convert strokes into character strings and to put the character strings (e.g., character string 1815) into fields (e.g., field 1813) of the InfoPath form 1801, InfoPath performs the conversion by performing the following steps:

For each EIC document object, InfoPath knows the strokes that belong to the EIC document object. InfoPath recognizes the strokes into text.
   InfoPath gets the field in InfoPath form according to the XPath information, and puts the text into the field.

In the examples shown in FIGS. 16 and 17, a printed EIC pattern is embedded. However, the printed EIC pattern is typically inconspicuous to reduce visibility to a user while still providing EIC information.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

The invention claimed is:

1. A system having a memory and a processor that embeds local metadata into an embedded interactive code document, the system comprising:
   a first array stored in the memory that contains a first repeating sequence of bits, the first array corresponding to position information of the embedded interactive code document;
   local metadata stored in the memory identifying a region within the embedded interactive code document;

a second array stored in the memory that contains a second repeating sequence of bits; and a local-meta-data-encoding module executing on the processor that combines the first array and the second array to generate a combined array with encoded local metadata, wherein the first array and the second array at least partially overlap in the combined array and wherein a start position of the second array in the combined array is shifted, by an amount that is based on the local metadata, relative to a start position of the first array in the combined array wherein the start position of the second array in the combined array is represented as (x,y) and is calculated as $$x = \mod(local\ metadata,\ 2^{\frac{n}{2}} + 1),$$
$$y = int\left(\frac{local\ metadata}{2^{\frac{n}{2}} + 1}\right),$$

where n is an order of the combined array and $0 \leq$ local metadata $\leq 2^n - 2$ wherein when the combined array is printed on the embedded interactive code document both the position information and the local metadata value are represented on the embedded interactive code document.

2. The system of claim 1, wherein the first array is a position array.

3. The system, of claim 2, wherein the second array is a local-metadata array.

4. The system of claim 3, wherein the second repeating sequence of bits is the same as the first repeating sequence of bits.

5. A system having a memory and a processor that embeds local metadata into an embedded interactive code document, the system comprising:

a first array stored in the memory that contains a first repeating sequence of bits;

local metadata stored in the memory identifying a region within the embedded interactive code document;

a second array stored in the memory that contains a second repeating sequence of bits; and a local-meta-data-encoding module executing on the processor that combines the first array and the second array to generate a combined array with encoded local metadata such that a start position (x,y) of the second array in the combined array is shifted, by an amount that is based on the local metadata, relative to a start position of the first array in the combined array, wherein the first array is a position array, wherein the second array is a local-metadata array, wherein the second repeating sequence of bits is the same as the first repeating sequence of bits, and wherein the start position of the second array in the combined array is represented as (x,y) and is calculated as $$x = \mod(local\ metadata,\ 2^{\frac{n}{2}} + 1),$$
$$y = int\left(\frac{local\ metadata}{2^{\frac{n}{2}} + 1}\right),$$

where n is an order of the combined array and $0 \leq$ local metadata $\leq 2^n - 2$.

6. The system of claim 5, wherein the region identified by the local metadata is an embedded interaction code command control region.

7. The system of claim 5, wherein the region identified by the local metadata is a field, which accepts user input, in the embedded interactive code document.

8. A system having a memory and a processor that decodes local metadata from an embedded interactive code document, the system comprising:

a combined array with an encoded local metadata value stored in the memory, wherein the local metadata value is encoded in the combined array via a start position of a second array in the combined array being shifted, by an amount that is based on the local metadata value, relative to a start position of a first array in the combined array and wherein the first array and the second array at least partially overlap in the combined array;

a local-meta-data-decoding module executed by the processor that decodes the local metadata value from the combined array by determining the amount by which the second array is shifted, relative to the first array, in the combined array wherein the local-meta-data-decoding module calculates a value for the local metadata as $$local\ metadata = \mod(y_p - y_m,\ 2^{\frac{n}{2}} - 1) \cdot (2^{\frac{n}{2}} + 1) + \mod(x_p - x_m,\ 2^{\frac{n}{2}} + 1),$$

where n is an order of the combined array, $x_p$ is a first coordinate of the first position of the point P in the first array, $y_p$ is a second coordinate of the first position of the point P in the first array, $x_m$ is a first coordinate of the second position of the point P in the second array, and $y_m$ is a second coordinate of the second position of the point P in the second array.

9. The system of claim 8, wherein the first array is a position array.

10. The system of claim 9, wherein the second array is a local-metadata array.

11. The system of claim 10, wherein the first array contains a repeating bit sequence, and the second array contains the repeating bit sequence.

12. The system of claim 8, wherein the local-meta-data-decoding module decodes, from the combined array, the first array and the second array separately from each other.

13. The system of claim 12, wherein the local-meta-data-decoding module determines a first position $(x_p, y_p)$ of a point P in the first array and a second position $(x_m, y_m)$ of the point P in the second array.

14. A system having a memory and a processor that decodes local metadata from an embedded interactive code document, the system comprising:

a combined array with encoded local metadata stored in the memory, wherein local metadata is encoded in the combined array via a start position of a second array in the combined array being shifted, by an amount that is based on the local metadata, relative to a start position of a first array in the combined array; and a local-meta-data-decoding module executed by the processor that decodes the local metadata from the combined array by determining the amount by which the second array is shifted, relative to the first array, in the combined array, wherein the first array is a position array, wherein the second array is a local-metadata array, wherein the first array contains a repeating bit sequence, and the second array contains the repeating bit sequence, wherein the local-meta-data-decoding module decodes, from the combined array, the first array and the second array separately from each other, wherein the local-meta-data-decoding module determines a first position of a point P in the first array represented as $(x_p,y_p)$ and a second position of the point P in the second array represented as $(x_m,y_m)$, and wherein the local-meta-data-decoding module calculates a value for the local metadata as $$\text{local metadata} = \text{mod}(y_p - y_m, 2^{\frac{n}{2}} - 1) \cdot (2^{\frac{n}{2}} + 1) + \text{mod}(x_p - x_m, 2^{\frac{n}{2}} + 1),$$

where n is an order of the combined array, $x_p$ is a first coordinate of the first position of the point P in the first array, $y_p$ is a second coordinate of the first position of the point P in the first array, $x_m$ is a first coordinate of the second position of the point P in the second array, and $y_m$ is a second coordinate of the second position of the point P in the second array.

15. A computer-readable storage medium containing computer-executable instructions for embedding a local metadata value into an embedded interactive code document by combining a first array and a second array to generate a combined array with an encoded local metadata value such that the first array and the second array at least partially overlap in the combined array and wherein a start position of the second array in the combined array is shifted, by an amount that is based on the local metadata value, relative to a start position of the first array in the combined array, wherein the first array contains a first repeating sequence of bits, and the second array contains a second repeating sequence of bits that is the same as the first repeating sequence of bits, wherein a value for the local metadata value is calculated as $$\text{local metadata} = \text{mod}(y_p - y_m, 2^{\frac{n}{2}} - 1) \cdot (2^{\frac{n}{2}} + 1) + \text{mod}(x_p - x_m, 2^{\frac{n}{2}} + 1),$$

where n is an order of the combined array, $x_p$ is a first coordinate of a first position of a point P in the first array, $y_p$ is a second coordinate of the first position of the point P in the first array, $x_m$ is a first coordinate of a second position of the point P in the second array, and $y_m$ is a second coordinate of the second position of the point P in the second array.

16. A computer-readable storage medium containing computer-executable instructions for embedding local metadata into an embedded interactive code document by combining a first array and a second array to generate a combined array with encoded local metadata such that a start position of the second array in the combined array represented as (x,y) is shifted, by an amount that is based on the local metadata, relative to a start position of the first array in the combined array, wherein the first array contains a first repeating sequence of bits, and the second array contains a second repeating sequence of bits that is the same as the first repeating sequence of bits and having further computer-executable instructions for calculating the start position of the second array in the combined array as $$x = \text{mod}(\text{local metadata}, 2^{\frac{n}{2}} + 1),$$
$$y = \text{int}\left(\frac{\text{local metadata}}{2^{\frac{n}{2}} + 1}\right),$$

where n is an order of the combined array and $0 \leq \text{local metadata} \leq 2^n - 2$.

17. The computer-readable storage medium of claim 16, having further computer-executable instructions for decoding the local metadata from the combined array by determining the amount by which the second array is shifted, relative to the first array, in the combined array.

18. The computer-readable storage medium of claim 17, having further computer-executable instructions for decoding, from the combined array, the first array and the second array separately from each other.

19. The computer-readable storage medium of claim 18, having further computer-executable instructions for determining a first position of a point P in the first array represented as $(x_p,y_p)$ and a second position of the point P in the second array represented as $(x_m,y_m)$.

20. The computer-readable storage medium of claim 19, having further computer-executable instructions for calculating a value for the local metadata as $$\text{local metadata} = \text{mod}(y_p - y_m, 2^{\frac{n}{2}} - 1) \cdot (2^{\frac{n}{2}} + 1) + \text{mod}(x_p - x_m, 2^{\frac{n}{2}} + 1),$$

where n is an order of the combined array, $x_p$ is a first coordinate of the first position of the point P in the first array, $y_p$ is a second coordinate of the first position of the point P in the first array, $x_m$ is a first coordinate of the second position of the point P in the second array, and $y_m$ is a second coordinate of the second position of the point P in the second array.

* * * * *